United States Patent
Pate

(10) Patent No.: US 7,187,343 B2
(45) Date of Patent: Mar. 6, 2007

(54) IMAGE PROJECTION WITH DISPLAY-CONDITION COMPENSATION

(75) Inventor: Michael A Pate, Tuscon, AZ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 406 days.

(21) Appl. No.: 10/608,971

(22) Filed: Jun. 26, 2003

(65) Prior Publication Data

US 2004/0140982 A1    Jul. 22, 2004

(51) Int. Cl.
G09G 5/00 (2006.01)

(52) U.S. Cl. .................. 345/1.2; 345/589; 345/591; 345/600; 345/619; 345/690; 348/333.1; 348/744; 353/30; 353/48; 353/49; 353/94; 382/171; 382/174

(58) Field of Classification Search ................ 345/147, 345/589, 600, 1.2, 591; 348/333.1, 744; 353/48, 49

See application file for complete search history.

(56) References Cited

U.S. PATENT DOCUMENTS

| | | | |
|---|---|---|---|
| 5,138,304 A | | 8/1992 | Bronson |
| 6,285,349 B1 * | | 9/2001 | Smith ......................... 345/690 |
| 6,292,228 B1 * | | 9/2001 | Cho ........................... 348/603 |
| 6,340,976 B1 * | | 1/2002 | Oguchi et al. .............. 345/690 |
| 6,480,202 B1 * | | 11/2002 | Deguchi et al. ............ 345/600 |
| 6,481,851 B1 | | 11/2002 | McNelley et al. |
| 6,483,555 B1 * | | 11/2002 | Thielemans et al. ........ 348/745 |
| 6,677,956 B2 * | | 1/2004 | Raskar et al. .............. 345/581 |
| 6,765,585 B2 * | | 7/2004 | Wada ......................... 345/589 |
| 6,791,565 B2 * | | 9/2004 | Kanai ......................... 345/589 |
| 6,834,965 B2 * | | 12/2004 | Raskar et al. ................ 353/94 |
| 2002/0041708 A1 | | 4/2002 | Pettitt |
| 2002/0051001 A1 | | 5/2002 | Kanai |
| 2002/0051121 A1 | | 5/2002 | Kanai |
| 2002/0118341 A1 * | | 8/2002 | Asakawa ...................... 353/31 |
| 2004/0140981 A1 * | | 7/2004 | Clark ......................... 345/600 |

OTHER PUBLICATIONS www.nec-pj.com/use4.htm, "NEC ProjectorsTechnology Tour: Easy to Focus", pp. 1-5, 2000-2002.

* cited by examiner

Primary Examiner—Kee M. Tung
Assistant Examiner—Antonio Caschera

(57) ABSTRACT

A method of projecting a compensated principal image may include projecting a principal image onto a surface and projecting an intended calibration image onto a calibration area of the surface. The intended calibration image may be projected when the principal image is not projected onto the calibration area. The calibration image displayed on the surface is received and compared to the intended calibration image to determine an observed difference. Projection of the principal image is modified based on the observed difference.

35 Claims, 3 Drawing Sheets

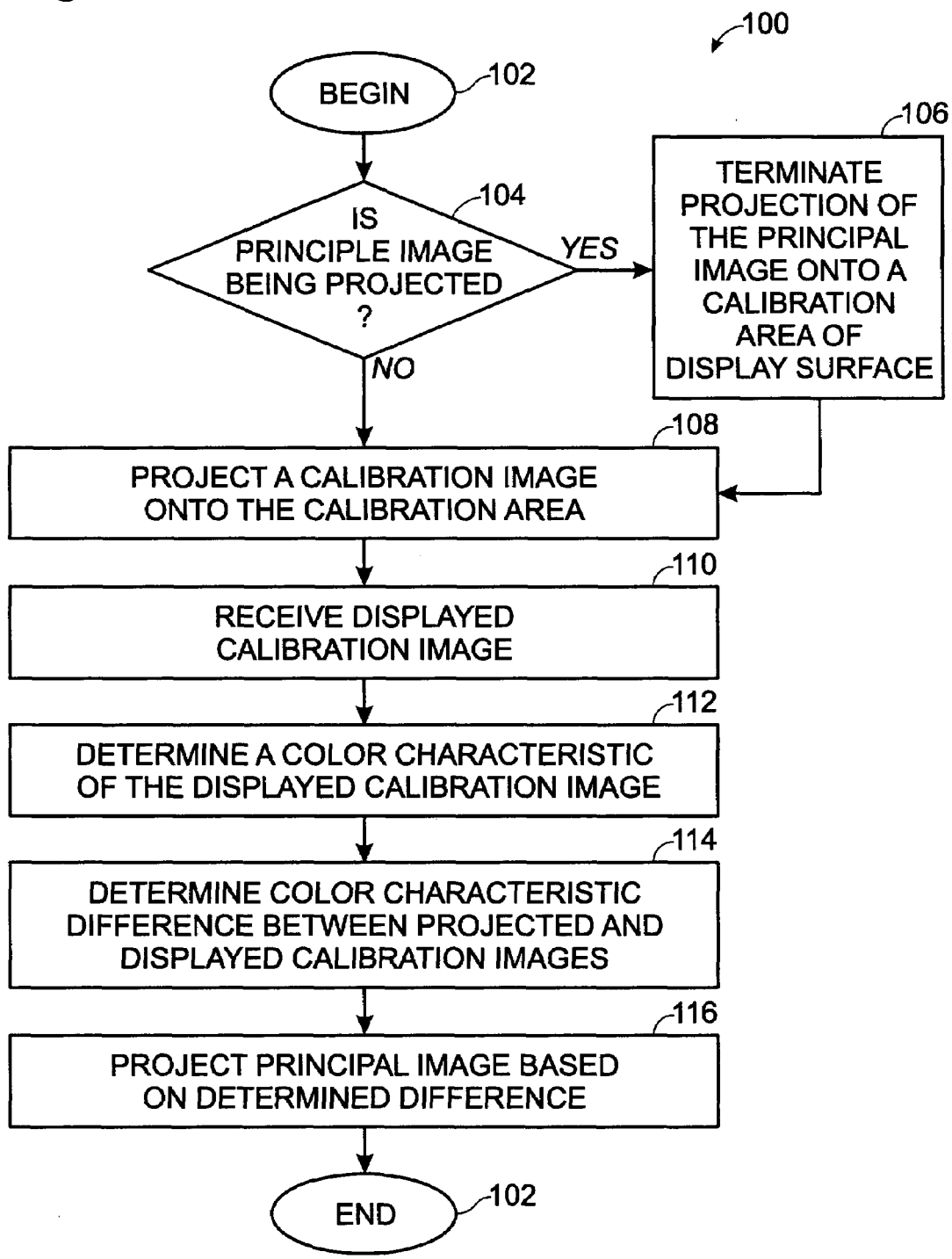

IMAGE PROJECTION WITH DISPLAY-CONDITION COMPENSATION

BACKGROUND

Image projection systems may be used to enlarge a still or video image, or to enable the image to be viewed simultaneously by a large or small audience. As both projection devices and the computers used to drive them have become increasingly smaller and more portable, it has become possible to give sophisticated visual presentations in venues that were previously inaccessible. Although modern projection equipment may now require only a power socket or battery power, the viewing conditions under which an image is viewed are subject to substantial variability. For instance, viewing surfaces onto which an image is projected may vary from a commercially available viewing screen to a colored wall. The light engine of a projector may alter the colors projected, and how the colors are altered may vary over time. The lighting conditions, whether natural or artificial, in which an image is viewed may alter the characteristics of a displayed image. Colors of the room environment, including the various room surfaces such as walls, floors, ceilings, furniture and fixtures, also may impact the way color displayed on a viewing surface is perceived.

SUMMARY

A method of projecting a compensated principal image may include projecting a principal image onto a surface and projecting an intended calibration image onto a calibration area of the surface. The intended calibration image may be projected when the principal image is not projected onto the calibration area. The calibration image displayed on the surface is received and compared to the intended calibration image to determine an observed difference. Projection of the principal image is modified based on the observed difference.

BRIEF DESCRIPTION OF THE DRAWINGS

FIG. 5 is a flowchart depicting an exemplary method of color-correcting a projected image, according to an embodiment of the invention.

DETAILED DESCRIPTION

Figure 1:
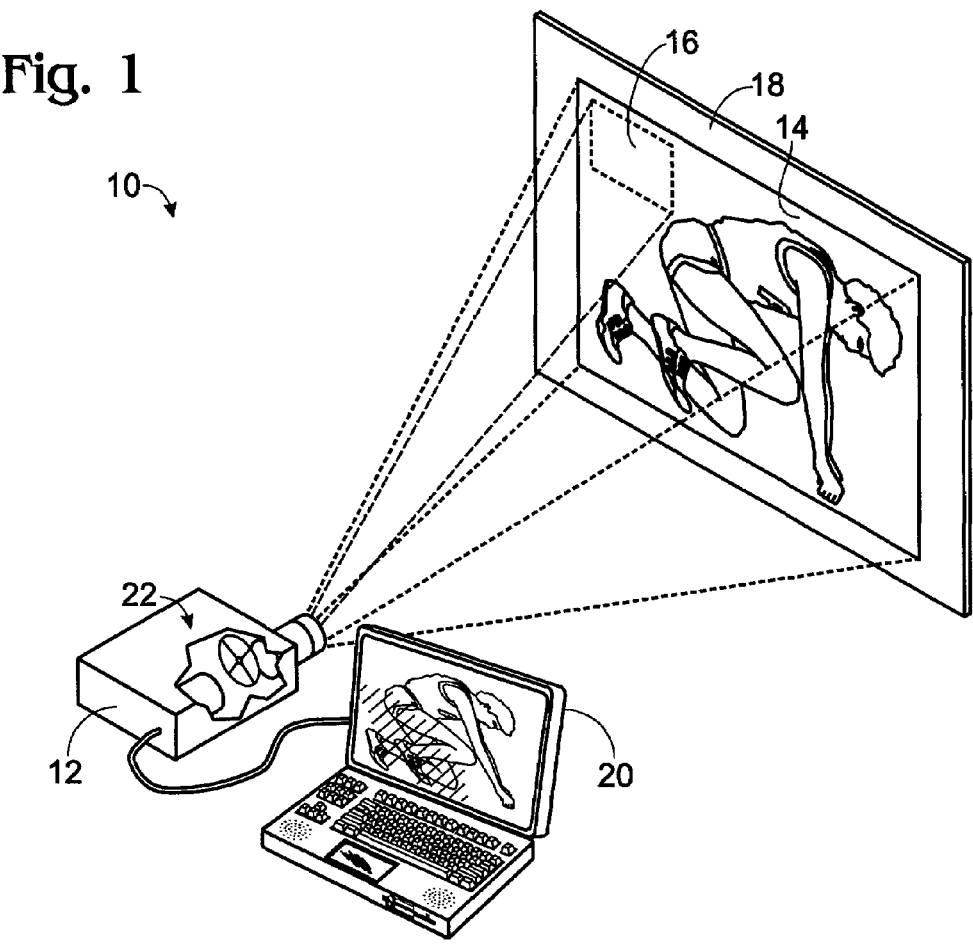
FIG. 1 is an isometric view of a display system according to an embodiment of the invention.

Referring initially to FIG. 1, a display system or electronic device according to an embodiment of the present invention is shown generally at 10. Specifically, FIG. 1 illustrates a front-projection display system including a projector or display device 12 adapted to produce a principal image 14 and a calibration image 16 on a display or viewing surface 18. A principal image may be an image of any nature that it is desired to have displayed on display surface 18 in an intended form, such as with reasonably accurate colors. A calibration image is an image that may have a known characteristic and may be used to provide feedback to the display system for use in modifying projection of a principal image for improving the corresponding characteristic of the principal image. The calibration image area may overlap the principal image area completely, partially or not at all. Display system 10 may provide for modification of a principal image based on a comparison of an intended calibration image with a displayed calibration image.

As mentioned, display surface 18 may be a screen, wall, partition, or other surface selected for viewing the principal image. Projector 12 typically is associated with a source of image data, depicted in FIG. 1 as a laptop computer 20. Projector 12 thus may be configured to project a principal image 14 derived from principal image data received from computer 20.

The projector may take the form of a digital projector, or any other suitable projection device. It may be appreciated that many types of projection and electronic systems may be suitable. The projector itself may include, but is not limited to, digital overhead projector panels, digital projectors using spatial light modulators such as active liquid crystal display (LCD), Liquid Crystal on Silicon (LcoS), digital micromirror devices (DMD), interference based modulators and diffractive base modulators. The images projected by the image projector may include still images or video images. Both still and video images will be referred to herein simply as images.

Projector 12 typically includes a light engine apparatus 22. Light engine apparatus 22 may have various configurations, and is typically configured to direct and transmit light to display surface 18 so as to generate a projected image, such as an image of a spatial light modulator. The projected image may be derived from, and therefore generally correspond to, image data received from computer 20. Light engine apparatus 22 may include one or more light engines 24. Light engine 24 may include any suitable illumination source adapted to address optically display surface 18, including a single light source (such as a mercury lamp, xenon, sodium plasma lamp, or other plasma source, incandescent lamp, etc.) and/or multiple light sources (such as solid-state sources, including light emitting diodes (LEDs), laser diodes, VCSEL, etc.). Additionally, light engine 24 may include lamp reflectors, color filter wheels, fixed or dynamic spectral filters, integrating rods, condenser-lens and field-lens illumination optics, spatial light modulators, scanning mirrors, projection lenses, color-generation devices, controllers, etc. that may accommodate production of a multi-color image on the display surface.

Figure 2:
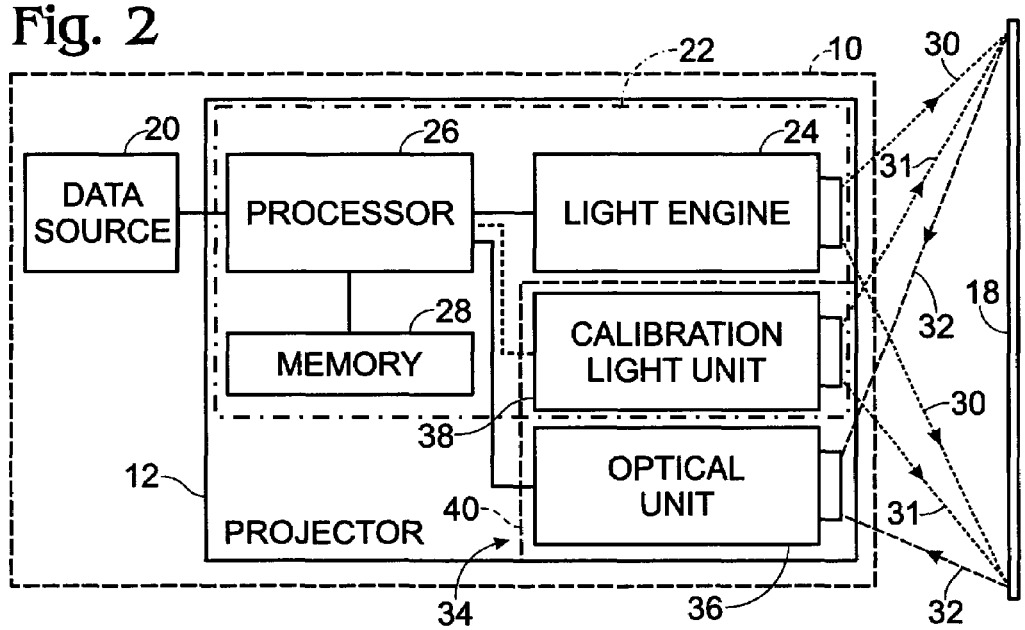
FIG. 2 is a schematic representation of a display system according to an embodiment of the invention.

As depicted schematically in FIG. 2, display system 10, or optionally, light engine apparatus 22, may also include a processor 26 that may be configured to receive image data from image data source 20 and to convert the image data into commands appropriate for driving light engine 24. Processor 26 may be in communication with a memory 28 that serves as temporary (or long term) storage of data such as image data, calibration information, color information, and other data needed by processor 26 to operate projector 12.

The image data source 20 may be, without limitation, a personal computer, such as a notebook computer, a personal digital assistant, or a mainframe computer such as a file server, DVD, CD ROM, HDTV, or other digital or analog source. The data connection between the image data source and the projector processor may include a hardwire connection, or may be a wireless data connection. Where the data connection is a hardwire connection, the hardwire connection may be a cable, in a local area network or a large area network. Alternatively, the data connection may include a wireless connection that utilizes modulated radiation, typically an infrared or RF (radio frequency) signal. Alternatively, projector 12 may create the projected image from image data stored internally by the projector, for example, using memory 28, so that connection to an external data source is unnecessary. Similarly, projector 12 may include a disk drive or other auxiliary memory device, enabling image data to be received by processor 26 directly. Images projected and displayed may accordingly be a principal image, a calibration image, or a combination of the two types of images.

In response to commands from the processor, light engine 24 typically transmits and directs visible light in the form of a projected principal image 30 to display surface 18 to produce displayed image 32. Such relationship assumes, however, that light engine 24 perfectly produces the color characteristics defined by the image data received by the projector, and that display surface 18 and the ambient display conditions provide a perfectly neutral display surface. This may not be the case.

Color characteristics, as used herein, may include the chromaticity coordinates, color temperature, and luminance of all or a portion of an image. Such color characteristics may be represented and accurately defined with reference to the coordinates of a particular color space. A color space is typically a mathematical construction that permits color information to be described numerically and/or plotted graphically. Various color spaces may reference color values such as chromaticity coordinates, color temperature, luminance, hue, chroma, lightness, brightness, value, reflectance, vividness, saturation, or chroma, among others.

Such selected color spaces may include HVC (Munsell) color space, RGB color space, HSV color space, HSL color space, YCC color space, XYZ color space, L*a*b* color space, L*u*v* color space, Lhs color space, Lhc color space, YXY color space, CMY color space, or CMYK color space, among others. These color spaces are typically characterized by the use of independent axes that define selected color values, as set out in Table 1 below for selected color spaces:

TABLE 1

Commonly used color models

| Color Model | Axis 1 | Axis 2 | Axis 3 |
|---|---|---|---|
| RGB | red intensity | green intensity | blue intensity |
| HVC | hue | value | chroma |
| HSV | hue | saturation | value |
| HSL | hue | saturation | lightness |
| L*a*b* | lightness | red/green balance | yellow/blue balance |
| Lhs | lightness | hue | saturation |
| Lhc | lightness | hue | chroma |
| CMY | cyan | magenta | yellow |

Color data incorporated in an image file may be defined with reference to coordinates in a selected color space. Coordinates in a particular color space may generally be converted to coordinates in an alternative color space by using an appropriate mathematical transform. The image data sent to the projector may include color information in RGB color space, or the image data may be converted to RGB color space before generation of the projected image by the light engine, as projection devices typically create a desired color by projecting appropriate specific spectral bands and magnitudes of light corresponding to combinations of red, blue, and green light (additive color synthesis).

As described above, an ideal light engine should be capable of generating a projected image having color characteristics that precisely match the color characteristics defined by the image data. Similarly, an ideal display surface should produce a displayed image having the color characteristics specified by the image data. However, in actual practice, the color characteristics of displayed image 32, which may include diffusely reflected and/or scattered light, may be detectably different from the color characteristics defined by the image data that the projector receives. Potential sources for these differences, for example, may include errors in the transformation of the image data into commands for the light engine 24, malfunctions or deficiencies in the operation of the light engine, deficiencies in the spectral transmission of the projector, the spectral contributions to the displayed image of a display surface that is not chromatically neutral, ambient lighting in the room where the display surface is located, or colors reflected, scattered or diffracted by other surfaces in the room where the display surface is located or viewed. A possible result of one or more of these factors is that the color characteristics of displayed image 32 might be detectably different from those specified by the image data.

For example, the display surface may include a non-neutral surface color, such as a yellow tint. The projection of white light onto such a display surface will yield a yellow-tinted reflected image, as the pigments in the wall absorb a portion of the non-yellow wavelength of the incident white light, and disproportionately reflect the yellow wavelengths. The net result in this case may be a displayed image that includes a greater yellow component than was specified by the original image data.

In a far more complicated example, the display surface may include one or more markings, for example such as may be present in a wallpaper pattern. The projection of an image on such a non-homogeneous display surface may result in an unsatisfactory displayed image, where the presence of such visible markings may distract the viewer from the content of the projected image.

In order to compensate for the color characteristics of the display surface, display system 10 may include a feedback or calibration system 34 that permits the output of light engine 24 to be modified in order to at least partially compensate for the color characteristics of the display surface and other display conditions. The calibration system may be generally configured to compare the displayed image to the intended image in order to identify detectable differences between the displayed image and the desired image. The intended image may correspond to an image provided by intended image data and associated operating parameters of the light engine, such as use of filters, light source modulation, spatial light modulators, and other electro-optical characteristics of the light engine. Once the detectable differences have been identified, the projected image may be modified in order to at least partially compensate for the identified detectable differences.

The calibration system may be incorporated in projector 12, as shown in FIG. 2. The calibration system may include an optical unit 36 that is configured to detect the optical characteristics of the displayed calibration image. Optical unit 36 may include a sensor, where the sensor may be configured to detect the color characteristics of the displayed image. Typically, the optical unit includes a camera or other color-sensing device, however any sensor capable of detecting the desired color characteristics is a suitable sensor for the purposes of this disclosure. The light sensor may include one or more color temperature sensors, a calorimeter, a spectraradiometer that measures spectral radiance, a charge-coupled device (CCD), a photodiode, or other color and light-sensitive element.

Projector 12 may also be configured as a rear-projection projector, in which case the face of screen 18 opposite from the light engine is the actual viewing surface. In order to measure directly the colors perceived by a viewer, optical unit 36 may be provided in a housing separate from the other components of the projector, but also in communication with processor 26. In this way, the optical unit may be positioned to view the image displayed on the viewed side of the screen. The optical unit, 36, may also be incorporated within projector 12, as has been described previously, for measuring the projected image as well as ambient diffuse colored light spilling into the projector through the viewing surface that may detract from the image as viewed from the front. Although the sensed displayed image is not the same image as the image viewed by viewers, it may be correlated to provide image correction.

As a further alternative, regardless of whether projector 12 is configured as a front or rear-projection projector, optical unit 36 may be attached to or built into the screen in a location where it will be impinged by the calibration image, such as the location of calibration image 16 shown in FIG. 1. Such an embodiment would not sense any modification of the image produced by the display surface.

The calibration system may also include a separate light engine, referred to as a calibration light unit 38. Light unit 38 may be limited to producing calibration images, such as white, red, green and blue lights of known or intended color characteristics, multicolor images providing color test patterns, or more complex images. The calibration light unit and the optical unit may be considered a calibration unit 40 included in calibration system 34.

The calibration image may be limited to a portion or subunit of the image area of a principal image, such as calibration image 16 shown in principal image 14 in FIG. 1. This reduced size calibration image may be provided, for example, by replacing a portion of a principal image with the calibration image and projecting the combination image. Alternatively, the calibration image may be produced by calibration light unit 38, and projected separately from the principal image, as shown generally at 31.

The calibration image may occupy the same or a different image area on display surface 18. The calibration and principal image areas may be separate, completely overlap, or partially overlap. Further, if a projector has a single light engine 24, a portion of a principal image may be deleted or modulated to provide a calibration image in an area on which the principal image is not projected. In summary then, the calibration and principal images are at least either spatially or temporally separate during calibration. Accordingly, if the calibration image is projected onto a different area of the display surface than the principal image is projected, the two image types have spatial separation. In this latter case, a calibration procedure may be performed while the principal image is being projected.

Figure 3:
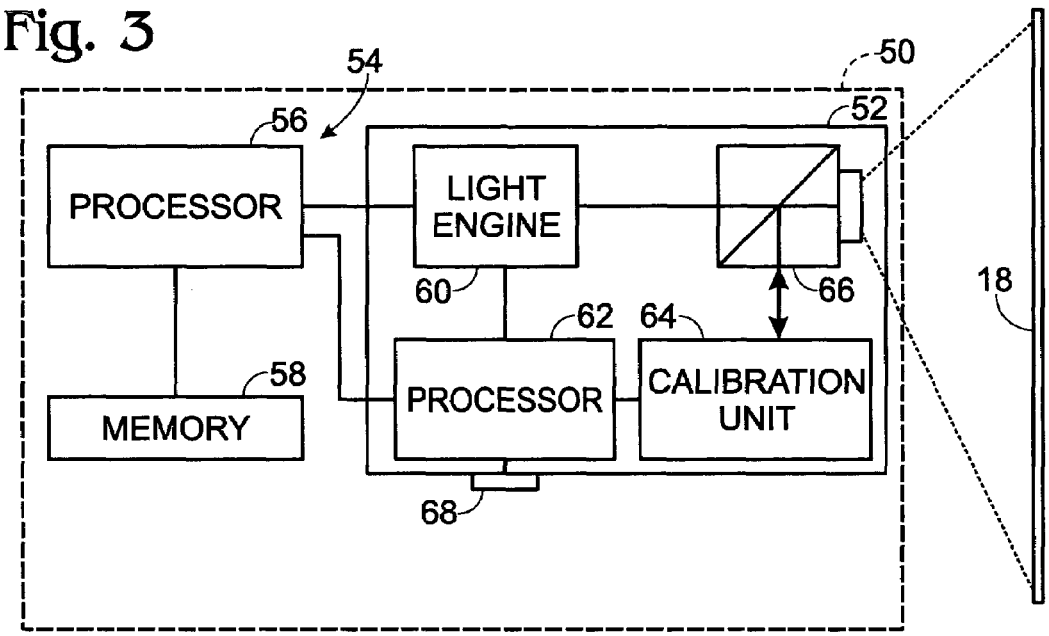
FIG. 3 is a schematic representation of another display system according to an embodiment of the invention.

When located within the projector, the optical unit may be located so as to minimize differences in the field of view of the optical unit and the displayed image. In fact, the digital image projector and the optical unit may utilize the same optics for both projection and image sensing. This may be accomplished, for example, by placing a beamsplitter or equivalent optical device in the optical pathway of the digital projector, as shown in FIG. 3. FIG. 3 shows a display system 50 having a projector 52 and a computer 54.

Computer 54 may include a processor 56 and memory 58. As has been described, processor 56 may provide image data, computer programs and instructions stored in memory 58 to projector 52. Projector 52 may include a light engine 60, a resident processor 62, and a calibration unit 64. Calibration unit 64 may include an optical unit (not shown in FIG. 3) as described above. A calibration light source (also not shown in FIG. 3) may be included in calibration unit 64, or light engine 60 may be relied upon to provide calibration images.

Projector 52 further includes a beamsplitter 66. The beam splitter may be static, such as a fixed prism or plate. The beam splitter may also be dynamic, such as a spinning segmented mirror or other mirror that is intermittently or temporarily inserted into the optical path during calibration or measurement, and removed from the projection path during normal projector operation. In the case of a static beam splitter, an image to be projected that is generated by the light engine passes through the beamsplitter, while a portion of the light reflected from the display surface 18 is reflected by the beamsplitter and directed to the optical unit in the calibration unit. If a calibration light unit is included in calibration unit 64, then another beam splitter may be used to separate the projection and reception of calibration images. The use of a common set of optics for both projection and image sensing simplifies the setup of the display system, allows for the calibration image to be projected at a calibration area that overlaps with the principal image viewing area, and may also facilitate calibration of the optical unit. An input device 68, such as a switch or keypad, coupled with the processor may optionally provide for manual initiation of a calibration process.

Figure 4:
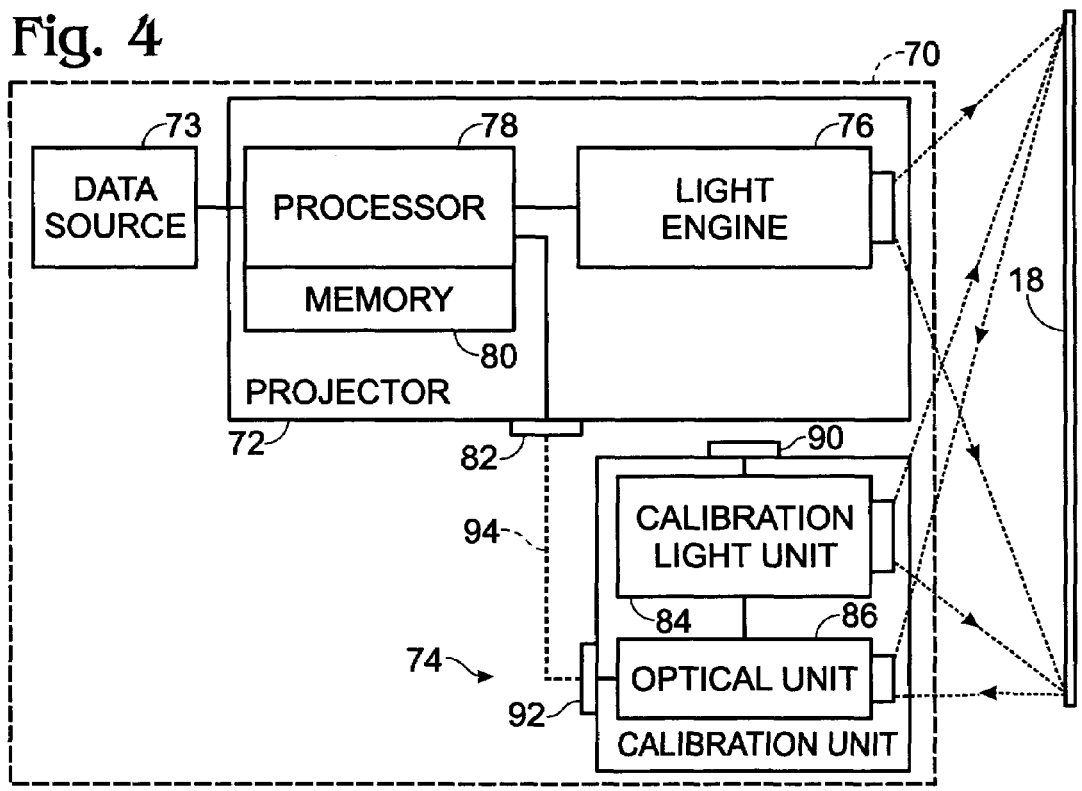
FIG. 4 is a schematic representation of yet another display system according to an embodiment of the invention.

The calibration unit may also be distinct from the projector. When distinct from the projector, the calibration unit may be incorporated in a separate device that is associated with the projector, as shown in FIG. 4. Under these circumstances, the optical unit of the calibration unit may be a camera or other color-sensing device. In a front projection system, the optical unit may be located in substantially close proximity to the projector, to reduce distortion in the image caused by viewing a displayed image at an angle.

A display system 70, shown in FIG. 4, may include a projector 72, a data source 73, and a calibration unit 74. Projector 72 may include a light engine 76, a processor 78 and memory 80, similar to projector 12. In this embodiment, projector 72 includes a housing enclosing the processor, memory and light engine. An input device 82 may be mounted onto the housing and coupled to the processor for inputting color correction information. Accordingly, input device 82 may be similar to input device 68 to initiate a calibration procedure or to input data output by calibration unit 74.

Calibration unit 74 may include a calibration light unit 84 and an optical unit 86 mounted in a housing. Alternatively, the calibration light unit and optical unit may be separate. An input device 90 may be coupled with calibration light unit 84 and/or optical unit 86, and may be used to initiate a calibration process. Calibration light unit 84 and/or optical unit 86 may include a processor (not shown) for operating these units. Such a resident processor may also process information received by the optical unit for generating an output signal on an output device 92. The output signal may be raw data sensed by the optical unit, or it may be data derived from the optical unit. Output device 92 may include a visual display (not shown) for displaying, digitally or analogically, data received from the optical unit 86. Optionally, a communication link 94, whether of a hardwire connection or a wireless connection, may be used to transfer directly machine-readable data from the optical unit to processor 78.

Projector 70 may also be configured as a rear-projection projector, in which case the opposite face of screen 18 is the actual viewing surface. In order to measure directly the colors perceived by a viewer, optical unit 86 may be provided in a housing separate from the calibration light unit, and may also be in communication with processor 78. In this way, the optical unit may be positioned to view the image displayed on the viewed side of the screen.

Once the optical unit has detected and/or recorded the color characteristics of the displayed calibration image, the display system may compare the displayed calibration image to the intended calibration image. Although many methods and strategies may be employed for performing a meaningful comparison between a displayed image and an intended image. In one embodiment, the analysis may be facilitated by segmenting image data into a plurality of image subunits in order to compare the color characteristics of a particular subunit (or subunits). The actual number of subunits is not critical, and may be chosen for either speed of calculation or the quality of the resulting color correction. For example, a decision may be made based on whether it is desired to distinguish between different sections of a calibration image that includes a multi-color test pattern, or to compensate for color variations across the principal image area of the display surface. While dividing the image data into small subunits may improve the fidelity of the color correction and resolution of the corrected image, doing so may result in slower data processing, and therefore compromise refresh speed, a feature particularly noteworthy for moving images. In contrast, segmenting the image data into larger subunits (and thus a relatively small number of subunits) may enhance processing time, but may also result in less optimal color correction, as the resolution of the corrections applied may be low. Satisfactory color correction and adequate processing time may be achieved through the use of multiple high speed parallel processors dedicated to performing the requisite color comparison and color correction operations. The use of such processing systems may result in the ability to perform real-time color correction.

The image data may be segmented into an array of, for example 100 subunits by 100 subunits, resulting in 10,000 individual image segments. The number of subunits chosen for implementing the disclosed color correction process may be limited by the speed and processing ability available for a given projector. It should be appreciated that with appropriate computational resources, the image data may be segmented into larger arrays, such as an array of 640 by 480 subunits (307, 200 segments), or as many as 1,600 by 1,200 subunits (1,920,000 segments).

Once the image data has been segmented, the processor may extract the value of the color characteristic, such as average color, chromaticity, and/or luminance for each subunit. Typically, the extracted color may correspond to a numerical value in a selected color space representing the average color intensity for that subunit in the range of 0–255 units of R,G, B. For example, utilizing RGB color space, a selected subunit may be found to have an average red value, an average green value, and an average blue value over the entire subunit. The average color intensity may be determined by taking an arithmetic average of the calculated color intensity over the area of the subunit. For example, taking a selected subunit of image data that includes 10 pixels, if half the subunit pixels have a color value in RGB color space of (R, G, B)=(100, 100, 200) and half the subunit pixels have a color value of (R, G, B)=(200, 100, 150), the average intensity for the subunit may be obtained by averaging across the subunit:

$$R_{ave} = \frac{(5 \times 100) + (5 \times 200)}{10} = 150$$

$$G_{ave} = \frac{(10 \times 100)}{10} = 100$$

$$B_{ave} = \frac{(5 \times 200) + (5 \times 150)}{10} = 175,$$

resulting in an average calculated color value for the selected subunit of (R, G, B)=(150, 100, 175). It should be appreciated that the average color value is not dependent upon a particular color space, and that a similar calculation may be performed in other coordinate systems.

Referring again generally to FIG. 2, average color values may be similarly extracted for each of the subunits of the image data, and these average values may be stored in memory 28 of projector 12. Original intended calibration image data may be used to generate a projected calibration image with the light engine. Optical unit 36 may then detect the resulting displayed calibration image. The color characteristics for the displayed calibration image may be stored in memory 28 as well. In order for processor 26 to meaningfully compare the color characteristics of the displayed image with the calculated average color values, the detected displayed color characteristics may be segmented into subunits corresponding generally to the subunits of the original image data. That is, the color data detected for the displayed image may be segmented into the same number, relative size, and relative placement within the image. The average color intensity across each displayed subunit may then be calculated, similarly to the calculation of the average image data color intensity above.

Processor 26 may compare the average color intensity for each displayed subunit with the calculated average color intensity for the corresponding image data subunit. Where the displayed subunit exhibits an average color value that differs from the calculated average color intensity, the processor may apply a correction to subsequent image data for that subunit.

It should be appreciated that there may be a predetermined threshold difference value below which no correction is applied. Where the displayed image color and the calculated image color differ only slightly, for example by an amount below the detection threshold of an average viewer, a correction of the projected image may be unnecessary, and therefore not applied.

Where a correction is called for, a correction factor may be applied to a projection value, that is, to one or more parameters used to generate the projected image. For example, a correction factor may be applied to the principal image data received from data source 20, such that the color values defined in the image data are modified so as to reduce the difference between the desired image and the displayed image. Alternatively, correction may be in the form of replacement image data obtained from color look-up tables, or selection of correction factors based on color to be corrected obtained from color adjustment matricies, thereby allowing for different corrections for different colors. Also, correction may be applied to the particular light engine commands derived from the principal image data that correspond to the instructions to the light engine to project a particular principal image. In yet another alternative, correction may be applied directly to the operating parameters of the light engine independent of the particular commands received by the light engine, for example scaling the output intensity of the light engine up or down, increasing the contrast of the light output, or changing in-line filters. In any case, correction may be selected so as to compensate for the characteristics of the light engine, display surface or ambient conditions that produce the observed differences. Accordingly, application of the correction may serve to reduce the observed differences in the displayed image color value relative to the desired or expected color characteristics represented by the image data.

Typically, the applied correction corresponds to an alteration of the projected light intensity in one or more of the red, green, or blue channels. This alteration of the spectral bandpass of each color may be established by the use of one or more color filter wheels, or one color filter wheel with one or more different bandpass filters and/or different center wavelength filters. Where the determined difference in color characteristics is due to a deficiency or malfunction in the light engine itself, the application of a correction may substantially correct the determined difference. For example, where the light engine projects red light at a reduced intensity relative to the projected green and blue intensity levels, a correction factor may be applied to the color data for the entire projected image to overcome the deficiency. For example where the calculated average color intensity (R, G, B) is (120, 210, 195), but the determined average displayed color intensity is (108, 211, 196), the correction factor may correspond to multiplying the red value of the image data by a factor of 1.1. Similar scaling operations may be used in order to apply a correction factor to the entire projected image.

Where the detectable difference in color characteristics may be due to the display surface having a nonhomogeneous appearance, for example due to the presence of surface markings, an applied correction may be used to at least partially compensate for the chromatic content of the surface markings. Where the surface markings have approximately the same size as, or are larger than the size of the subunits, application of the correction is more likely to minimize the effect of the surface markings. Where the surface markings are smaller than the size of the subunits, the color correction will be based upon the color characteristic for the subunit, and the markings may therefore remain substantially visible after correction.

In a simplified view we may consider the case where the display surface includes red markings. The surface markings are perceived as 'red' because the markings themselves absorb wavelengths of light other than light having a wavelength in the red region, which is reflected. Where the projector attempts to project a white light onto such red markings, (where white light is defined as (R, G, B)=(255, 255, 255) for example) reflected light from the surface markings may exhibit a pink color, for example corresponding to a reflected average color of (R, G, B)=(255, 200, 200). The application of a correction factor to a subunit falling within such a marking may include implementing a corresponding decrease in the intensity of red light for that subunit of the projected image, so that rather than projecting white light, light having a color quality of, for example, (R, G, B)=(200, 255, 255) may be projected onto the surface marking. As the surface marking differentially absorbs green and blue wavelengths, but substantially reflects red, the resulting reflected light may have a color intensity of, for example, (R, G, B)=(200, 200, 200). Although the corrected subunit may not appear white as specified by the image data, the subunit may exhibit a corrected appearance that includes a chromatically neutral gray rather than pink, and the visual impact of the surface marking on the overall projected image may be thereby decreased.

It should be apparent that rather than decreasing the intensity of the light displayed by the surface marking, a similar correction may be effected by increasing the intensity of the wavelengths absorbed by the surface marking. In the above example, rather than decreasing the output in the red wavelengths, the blue and green wavelengths could be correspondingly increased. This correction mode may be available where additional light intensity is available to the projector used at the particular subunit under evaluation. A general increase in light output may be achieved in all of the colors by pulsing the light source during a white segment of the rotating sequential color filter wheel. Of course the energy may then need to be reduced for some other color, such as red in this example, or during the white phase of the wheel rotation. One or more of the colors R, G, B may also be increased in light output by pulsing the bulb during the particular color segment(s) of choice.

In one embodiment, the correction factor may be determined for a given projected image only once. For example, as part of an initial power up of the projector, the light engine may project one or more color calibration images. A correction may be determined based upon an initial comparison of the expected color of the calibration image and the detected color of the calibration image. The correction may then be applied to a projection value for subsequent projected images, until the projector is recalibrated or shut down. This mode of operation may be particularly desirable where the projector is fixed and the display surface and conditions do not vary during a given presentation.

Alternatively, the correction may be determined using an ongoing process, where color analyses may be performed periodically, with the determination of new correction factors. Also, a user may input a request to initiate the calibration process. The correction may also be determined using an iterative process, where a first correction is applied, generating a corrected projected image, and the corrected displayed image is then compared to the image data. Differences between the corrected displayed image and the image data may then result in the application of one or more additional corrections, with additional correction of the projected image occurring iteratively until either the color characteristics of the displayed image match the desired color characteristics, for example to within a predetermined and acceptable error value, or until the processor recognizes that no further correction is possible.

The color correction process described herein may occur in real-time. That is, the projector may be actively correcting the color output of the light engine on an ongoing basis as a presentation is projected. In such applications, the projection of principal images may be interrupted to the extent they overlap with calibration images. The ability of the projector to accomplish real-time color correction may be limited by the capabilities of the processor used to analyze the image data and the displayed image color characteristics. As discussed above, the demand on the processor may be related to the number of subunits the outgoing and incoming image is subdivided into. The possibility of real-time color correction, with an ability to rapidly compensate for variations in the appearance of the display surface may permit a projected presentation to be displayed on a constantly or intermittently variable display surface (for example, where the presentation is projected from a moving platform such as a rotating stage or moving vehicle, or to compensate for changes in lighting conditions during the course of a presentation).

An example of a method of color-correcting a projected image using a calibration system of display system 10 is depicted generally in flowchart 100 of FIG. 5. Upon initiation of the method, at 102, a determination may be made, at 104, as to whether a principal image is being projected onto the calibration area of the display surface. If so, projection of the principal image onto the calibration area is terminated at 106. If the calibration area and principal image area do not overlap, then the foregoing may be unnecessary. If a principal image is not being projected, such as at startup, or after termination of the projection of the principal image in any area of overlap with the calibration area, a calibration image is projected onto the calibration area at 108.

The projected calibration image is displayed on the display surface and received by an optical unit at 110. A color characteristic of the received displayed calibration image, such as chromaticity, color temperature, luminance, and average color, is determined at 112. A color characteristic difference between the intended calibration image and the displayed calibration image is determined at 114. A principal image that is modified based on the determined color characteristic difference is projected at 116.

The color correction method depicted in flowchart 100 may be used upon initiating a presentation, as part of the display system calibration. The correction determined thereby may be applied throughout the following presentation. Alternatively, the display system may be configured to perform a single calibration cycle upon receipt of new image data, that is, to calculate and apply a single correction for a particular set of image data. In another alternative, the display system may perform multiple calibration iterations, refining the correction that is applied during each cycle. It is possible that due to the nature of the display surface, or limitations of the projector, no correction may completely correct the displayed image. In this case, the display system may be configured to abandon the calibration loop after a predetermined number of iterations, in order to avoid interfering with the projected presentation.

Alternatively, or in addition, the display system may apply a color correction method similar to that depicted in flowchart 100 when new principal image data is periodically received. For example, where the presentation includes one or more static images, or slides, color correction may be performed whenever the principal image data changes. Where the presentation includes moving images, or video images, the principal image data may be updating substantially constantly. In this case, the display system may be configured such that color correction occurs at a predetermined periodic rate, or that only a single iteration of the color correction process is performed before new image data is received. It should be appreciated that a variety of methods may exist for performing the color correction method disclosed herein as new image principal data is received by the projector.

In order for display system 10 to properly achieve the color correction described herein, it may correlate the displayed calibration image with calibration image data saved in memory. In order to perform such correlation, the display system may be calibrated in order to establish a relationship between the captured displayed image and the projected calibration image. Such calibration processes may be simplified where the image sensor and the digital image projector utilize the same optical pathway, as discussed above. However, where the image sensor and the digital projector do not share an optical pathway, calibration of the image sensor may be useful in accurately mapping the subunits of the color data captured by the optical unit onto the subunits of the image data formulated by the processor.

A variety of calibration methods and timing may be utilized. Calibration may be automatic upon startup of the projector, or upon manual activation of a calibration routine, for example using an operator interface such as a touch pad on the projector, or by executing a command at an associated computer. The calibration procedure itself may be automatic, or may require operator input. For example, upon execution of a calibration command, the projector may project a calibration image in the form of a full screen of a selected color, whereupon the optical unit in combination with the processor interprets a captured image of the projected image to identify the four corners of the projected image and associate them with corresponding "corners" of the image data.

Alternatively, upon activation of a calibration feature, an operator may sequentially 'paint', or project a point light source onto, each corner of the projected image for the optical unit to capture, thereby permitting the processor to map the projected image to the corresponding image data. Although the calibration methods described herein are intended to generate correspondence between the image data and the captured color characteristics in order to facilitate the color correction processes described herein, such calibration techniques may also be utilized to identify and digitally compensate for key stoning and other errors in projection that may affect the projected image.

Appropriate software instructions to effect the methodology of an embodiment of the invention may be employed via a computer-readable medium. A "computer-readable medium," as used herein, can be anything that can contain, store, communicate, propagate, or transport such instructions for use by or in connection with an imaging system or imaging apparatus. The computer-readable medium may be, without limitation, an electronic, magnetic, optical, electromagnetic, infrared, or semiconductor system, apparatus, device, or propagation medium. More specific examples of a computer-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), and a portable compact disc read-only memory (CDROM) (optical). Note that the computer-readable medium could even be paper or another suitable medium upon which the program may be printed, as the program can be electronically captured, via for instance optical scanning of the paper or other medium, then compiled, interpreted or otherwise processed in a suitable manner if necessary, and then stored in a computer memory.

The instruction on the computer-readable media may represent an upgrade to projector software previously available, in order to permit the execution of the above-described method, or to execute an upgraded version of such software.

The display system described herein permits a display system operator to compensate for non ideal display surfaces and ambient display conditions by performing real time color correction of a projected image. The display system may facilitate impromptu presentations on nonstandard display surfaces with reduced loss of image fidelity, or even projection of presentations upon moving surfaces, or from moving projection platforms in a changing display environment. The resulting presentation may offer improved fidelity in color reproduction in a variety of projection venues.

It is believed that the disclosure set forth above encompasses multiple distinct embodiments. While each of these embodiments has been disclosed in specific form, the specific embodiments thereof as disclosed and illustrated herein are not to be considered in a limiting sense as numerous variations are possible. The subject matter of this disclosure thus includes all novel and non-obvious combinations and sub-combinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

What is claimed is:

1. A method of projecting an image with display-condition compensation, the method, comprising:
   projecting a principal image onto a principal area of a display surface, the display surface disposed for viewing by one or more people;
   projecting an intended calibration image onto a calibration area of the display surface when the principal image is not projected onto the calibration area, the calibration area forming a subunit of the principal area;
   receiving a reflection from the display surface of the projected calibration image;
   comparing the received calibration image to the intended calibration image to determine an observed difference; and
   modifying projection of the principal image based on the observed difference;
   where projecting a principal image includes projecting a principal image without a portion of the principal image corresponding to the calibration area, and projecting a calibration image includes projecting the calibration image onto the calibration area while projecting the principal image without the portion.

2. The method of claim 1, where comparing the received calibration image to the intended calibration image includes determining a color characteristic of the received calibration image and comparing it to a corresponding color characteristic of the intended calibration image.

3. The method of claim 1, where comparing the received calibration image to the intended calibration image includes comparing an intended calibration image color characteristic to a received calibration image color characteristic corresponding to at least a portion of the calibration area.

4. The method of claim 1, further comprising:
   segmenting the intended calibration image into a plurality of multi-pixel subunits; and
   segmenting the received calibration image into a corresponding plurality of multi-pixel subunits;
   where comparing the received calibration image to the intended calibration image includes determining a color characteristic for each intended calibration image subunit, determining a color characteristic for each received calibration image subunit; and
   comparing the intended calibration color characteristic to the received calibration image color characteristic for at least one subunit.

5. The method of claim 1, where modifying the projected principal image includes determining a correction based on the observed difference.

6. The method of claim 5, where modifying the projected principal image includes applying the correction to principal image data.

7. The method of claim 5, where modifying the projected principal image includes applying the correction to commands received by a light engine to create the projected principal image.

8. The method of claim 5, where modifying the projected principal image includes applying the correction to one or more operating parameters of a light engine used to create the projected principal image.

9. The method of claim 1, where projecting the principal image includes projecting the principal image from at least a first light source, and projecting an intended calibration image includes projecting the intended calibration image from at least a second light source.

10. The method of claim 1, further comprising, prior to modifying the principal image, modifying the calibration image, projecting the modified intended calibration image onto the calibration area of the display surface when the principal image is not projected onto the calibration area, receiving the modified calibration image displayed on the display surface, and comparing the received modified calibration image to the modified calibration image to determine an observed difference.

11. The method of claim 1, where comparing the received calibration image to the intended calibration image includes:
    determining a color characteristic for at least a subunit of the received calibration image; and
    determining a difference between the determined color characteristic and an intended color characteristic of at least a subunit of the intended calibration image.

12. The method of claim 11, where modifying the projection of the principal image includes determining a correction configured to reduce the determined difference between the intended and determined color characteristic, and modifying projection of the principal image based on the determined correction.

13. The method of claim 12, where modifying projection of the principal image includes modifying principal image data.

14. The method of claim 12, where modifying projection of the principal image includes modifying one or more light engine commands derived from principal image data.

15. The method of claim 12, where modifying projection of the principal image includes modifying one or more operating parameters of a light engine.

16. The method of claim 11, where determining a color characteristic, and determining a difference between the determined color characteristic and an intended color characteristic is repeated for each subunit of the intended calibration image and corresponding subunit of the displayed calibration image.

17. The method of claim 11, where a color characteristic includes one or more of an average red intensity, an average blue intensity, an average green intensity, average color, chromaticity, color temperature and luminance.

18. The method of claim 11, further comprising capturing the displayed calibration image using at least one of a color-sensing device, a colorimeter, a luminance meter, a color temperature meter, and a camera.

19. A display device comprising:
    a light engine apparatus configured to project a principal image and an intended calibration image onto a display surface, the display surface disposed for viewing by one or more people, where at least a portion of the intended calibration image has an intended first color characteristic, and where the light engine apparatus includes a light engine configured to project the principal image and a calibration light unit configured to project the intended calibration image;

an optical unit configured to receive a reflection from the display surface of the projected calibration image; and a processor configured to direct projection of the intended calibration image onto a calibration area of the display surface when the principal image is not projected onto the calibration area;

compare the received calibration image to the intended calibration image to determine an observed difference between the intended calibration image and the received calibration image; and modify projection of the principal image based on the observed difference.

20. The display device of claim 19, where the optical unit is at least one of a color-sensing device, a colorimeter, a luminance meter, a color temperature meter and a camera.

21. The display device of claim 19, further including memory connected to the processor, where the memory is configured to store the intended first color characteristic.

22. The display device of claim 19, where the calibration light unit projects the intended calibration image along at least a portion of a light path along which the light engine projects the principal image.

23. The display device of claim 22, further comprising an optical device configured to insert the intended calibration image into the light path along which the principal image is projected.

24. The display device of claim 23, where the optical unit receives the reflected calibration image along, at least a portion of the light path along which the calibration light unit projects the calibration image.

25. The display device of claim 19, further comprising a first housing containing the light engine, and a second housing containing the optical unit.

26. The display device of claim 25, where the second housing is freely movable relative to the first housing.

27. The display device of claim 26, further comprising an output device mounted on the second housing, the output device coupled to the optical unit for outputting a signal representative of the received calibration image.

28. The display device of claim 27, where the output device and optical unit are configured to output a signal representative of a received first color characteristic.

29. The display device of claim 27, further comprising an input device mounted on the first housing, the input device coupled to the processor for inputting the signal representative of the received calibration image.

30. The display device of claim 19, where the processor is further configured to:

determine an actual first color characteristic of at least a portion of the received calibration image;

calculate a difference between intended and actual first color characteristics for corresponding portions of the intended calibration image and the received calibration image;

calculate a correction based on the calculated difference between the intended and actual first color characteristics; and modify projection of at least one of the principal image and the calibration image based on the correction.

31. The display device of claim 30, where the light engine is configured to project the principal image onto a principal area of the surface including at least a portion of the calibration area, and the processor is further configured to direct the light engine not to project the principal image onto at least the calibration area of the surface while the calibration image is being projected.

32. The display device of claim 31, further comprising an input device coupled to the processor and configured to be manually actuated, the processor being configured to initiate projection of the calibration image when the input device is actuated.

33. The display device of claim 30, where the processor is further configured to terminate projection of the principal image on at least the calibration area of the surface while projecting the calibration image.

34. The display device of claim 30, where the color characteristic is at least one of an average color, a chromaticity, a color temperature and a luminance.

35. The display device of claim 34, where the average color includes one or more of an average red intensity, an average blue intensity and an average green intensity.

* * * * *

UNITED STATES PATENT AND TRADEMARK OFFICE
CERTIFICATE OF CORRECTION

PATENT NO. : 7,187,343 B2 Page 1 of 1
APPLICATION NO. : 10/608971
DATED : March 6, 2007
INVENTOR(S) : Pate It is certified that error appears in the above-identified patent and that said Letters Patent is hereby corrected as shown below:

In the Claims

Col. 15 (line 31), delete "along," and insert therefor --along--.

Signed and Sealed this

Seventh Day of August, 2007

JON W. DUDAS
*Director of the United States Patent and Trademark Office*